(12) United States Patent
Orr

(10) Patent No.: US 7,906,973 B1
(45) Date of Patent: Mar. 15, 2011

(54) CABLE TESTER

(75) Inventor: Michael Orr, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 421 days.

(21) Appl. No.: 11/510,007

(22) Filed: Aug. 25, 2006

Related U.S. Application Data

(60) Provisional application No. 60/812,236, filed on Jun. 9, 2006.

(51) Int. Cl.
G01R 31/11 (2006.01)
(52) U.S. Cl. ......... 324/533; 324/534; 324/527; 324/543
(58) Field of Classification Search .................. 324/539, 324/541, 543, 533, 534
See application file for complete search history.

(56) References Cited

U.S. PATENT DOCUMENTS

| 4,914,394 | A | 4/1990 | Meyer |
|---|---|---|---|
| 5,420,512 | A | 5/1995 | Spillane et al. |
| 5,461,318 | A | 10/1995 | Borchert et al. |
| 5,559,427 | A | 9/1996 | Hinds et al. |
| 5,629,628 | A | 5/1997 | Hinds et al. |
| 6,138,080 | A | 10/2000 | Richardson |
| 6,177,801 | B1 | 1/2001 | Chong |
| 6,198,727 | B1 | 3/2001 | Wakeley et al. |
| 6,272,120 | B1 | 8/2001 | Alexander |
| 6,341,358 | B1 | 1/2002 | Bagg et al. |
| 6,377,640 | B2 | 4/2002 | Trans |
| 6,417,672 | B1 | 7/2002 | Chong |
| 6,434,716 | B1 | 8/2002 | Johnson et al. |
| 6,438,163 | B1 | 8/2002 | Raghavan et al. |
| 6,448,899 | B1 | 9/2002 | Thompson |
| 6,522,152 | B1 | 2/2003 | Tonti et al. |
| 6,535,983 | B1 | 3/2003 | McCormack et al. |
| 6,600,726 | B1 | 7/2003 | Nevo et al. |
| 6,633,166 | B1 | 10/2003 | Kaiser |
| 6,694,017 | B1 | 2/2004 | Takada |
| 6,728,216 | B1 | 4/2004 | Sterner |
| 6,775,529 | B1 | 8/2004 | Roo |
| 6,777,952 | B2 | 8/2004 | Seymour |

(Continued)

FOREIGN PATENT DOCUMENTS

WO  WO 01/11861  2/2001

(Continued)

OTHER PUBLICATIONS

Gundersen, M. et al., Bipolar nanosecond pulse generation using transmission lines for cell electro-manipulation, Conference Record of International Power Modulator Symposium, 2004, May 23-26, 2004, p. 224-227.*

(Continued)

Primary Examiner — Thomas Valone

(57) ABSTRACT

A physical layer module (PHY) of a network device includes a control module and a cable-test module. The control module selectively generates a cable-test enable signal to test a cable including four pairs of twisted wire. The cable-test module tests the cable based on the cable-test enable signal. The cable-test module transmits test signals on the four pairs at a first time and receives return signals. The cable-test module determines that the cable is not faulty when the return signals received on first and second pairs of the four pairs have an amplitude less than a first predetermined amplitude, and when the return signals received on third and fourth pairs of the four pairs have an amplitude greater than a second predetermined amplitude and are received substantially contemporaneously.

44 Claims, 5 Drawing Sheets

U.S. PATENT DOCUMENTS

| | | |
|---|---|---|
| 6,795,701 B1 | 9/2004 | Baker et al. |
| 6,825,672 B1 | 11/2004 | Lo |
| 6,829,223 B1 | 12/2004 | Richardson et al. |
| 6,873,827 B1 | 3/2005 | Wright |
| 6,891,803 B1 | 5/2005 | Chang et al. |
| 6,898,185 B1 | 5/2005 | Agazzi et al. |
| 6,922,060 B1 | 7/2005 | Wendel et al. |
| 6,932,698 B2 | 8/2005 | Sprogis |
| 6,940,289 B2 * | 9/2005 | Hyacinthe et al. ............ 324/534 |
| 6,977,507 B1 * | 12/2005 | Pannell et al. ................ 324/534 |
| 6,980,007 B1 | 12/2005 | Lo et al. |
| 6,982,557 B1 | 1/2006 | Lo et al. |
| 6,992,491 B1 | 1/2006 | Lo et al. |
| 6,995,551 B1 | 2/2006 | Lo et al. |
| 7,002,353 B1 * | 2/2006 | Lo et al. ........................ 324/534 |
| 7,005,861 B1 * | 2/2006 | Lo et al. ........................ 324/533 |
| 7,019,533 B1 | 3/2006 | Lo et al. |
| 7,026,825 B1 | 4/2006 | Lo et al. |
| 7,058,559 B1 | 6/2006 | Roeck et al. |
| 7,068,043 B1 | 6/2006 | Lo et al. |
| 7,068,044 B1 | 6/2006 | Lo et al. |
| 7,068,611 B2 * | 6/2006 | Bui ............................... 370/252 |
| 7,072,323 B2 | 7/2006 | Roberts et al. |
| 7,075,283 B1 | 7/2006 | Lo et al. |
| 7,097,562 B2 | 8/2006 | Gagner |
| 7,127,481 B1 | 10/2006 | Lam |
| 7,161,911 B1 | 1/2007 | Fang et al. |
| 7,173,431 B1 | 2/2007 | Lo et al. |
| 7,181,544 B2 | 2/2007 | Vangal et al. |
| 7,190,172 B1 | 3/2007 | Lo et al. |
| 7,224,964 B2 | 5/2007 | Souissi et al. |
| 7,227,889 B1 | 6/2007 | Roeck at al. |
| 7,236,772 B1 | 6/2007 | Botzas |
| 7,246,368 B1 | 7/2007 | Millet et al. |
| 7,250,771 B1 | 7/2007 | Lo et al. |
| 7,251,235 B2 | 7/2007 | Wentink |
| 7,276,913 B1 | 10/2007 | Lo et al. |
| 7,358,745 B1 | 4/2008 | Lo et al. |
| 7,375,532 B1 | 5/2008 | Lo et al. |
| 7,403,018 B1 | 7/2008 | Lo et al. |
| 7,576,548 B1 | 8/2009 | Lo et al. |
| 7,701,867 B2 * | 4/2010 | Bui ............................... 370/252 |
| 2002/0046267 A1 | 4/2002 | Andra et al. |
| 2002/0124110 A1 | 9/2002 | Tanaka |
| 2003/0204611 A1 | 10/2003 | McCosh et al. |
| 2007/0022331 A1 | 1/2007 | Jamieson et al. |
| 2007/0230555 A1 | 10/2007 | Peleg et al. |
| 2008/0265915 A1 | 10/2008 | Clark et al. |

FOREIGN PATENT DOCUMENTS

| | | |
|---|---|---|
| WO | WO 01/11861 A2 | 2/2001 |
| WO | WO 01/11861 A3 | 2/2001 |

OTHER PUBLICATIONS

U.S. Appl. No. 09/991,043, filed Nov. 21, 2001.
U.S. Appl. No. 10/098,865, filed Mar. 15, 2002.
U.S. Appl. No. 60/217,418, filed Jul. 11, 2000.
Intel, "LXT9784 Octal 10/100 Transceiver Hardware Integrity Function Overview" Application Note, Jan. 2001, pp. 3-14.
IEEE std. 802.3 IEEE Standard for Information technology—Telecommunications and information exchange between systems—Local and metropolitan area networks—Specific requirements; Part 3: Carrier sense multiple access with collison detection (CSMA/DC) access method and physical layer specifications, 2002, pp. 1-173.
IEEE Computer Society; IEEE Standard 802.3ab; IEEE Std 802.3-2002, IEEE Standard for Information technology—Telecommunications and information exchange between systems—Local and metropolitan area networks—Specific requirements; Part 3: Carrier sense multiple access with collision detection (CSMA/CD) access method and physical layer specifications, Mar. 8, 2002, pp. 147-249.
IEEE Std 802.3-2002, Section Three; Carrier Sense Multiple Access with Collision Detection (CSMA/CD) access method and physical layer specifications; 2002; 379 pages.
IEEE Computer Society; IEEE Standard 802.3ab; IEEE Std 802.3-2002, IEEE Standard for Information technology—Telecommunications and information exchange between systems—Local and metropolitan area networks—Specific requirements; Part 3: Carrier sense multiple access with collision detection (CSMA/CD) access method and physical layer specifications, Mar. 8, 2002, pp. 174-249 and pp. 147-173.
IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with collision detection (CSMA/CD) access method and physical layer specifications; LAN/MAN Standards Committee of the IEEE Computer Society; Mar. 8, 2002; 578 pages.
IEEE Std 802.3-2002 (Revision of IEEE Std 802.3®, 2000 Edition) IEEE Standard for Information technology—Telecommunications and information exchange between systems—Local and metropolitan area networks—Specific requirements—Part 3: Carrier sense multiple access with Collision Detection (CSMA/CD) access method and physical layer specifications; Section Two: This section includes Clauses 21 through 22 and Annexes 22A through 32A; LAN/MAN Standards Committee of the IEEE Computer Society; Mar. 8, 2002; 582 pages.

* cited by examiner though, DSP, DSP fails to
CABLE TESTER

CROSS-REFERENCE TO RELATED APPLICATIONS

This application claims the benefit of U.S. Provisional Application No. 60/812,236, filed Jun. 9, 2006. The disclosure of the above application is incorporated herein by reference in its entirety.

FIELD

The present disclosure relates to cable diagnostic systems, and more particularly to diagnostic systems for testing network cables.

BACKGROUND

The background description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present disclosure.

One goal of a network manager is to control total cost of ownership of the network. Cabling problems can cause a significant amount of network downtime and can require troubleshooting resources, which increase the total cost of ownership. Providing tools that efficiently solve cabling problems may increase network uptime and reduce the total cost of ownership.

Referring now to FIG. 1, conventional cable testers 10 are frequently used to isolate cabling problems. The cable testers 10 are coupled by a connector 12 (such as an RJ-45 or other connector) to a cable 14. A connector 15 connects the cable to a load 16. The cable testers 10 typically require the load 16 to be a loop back module. The cable testers 10 perform cable analysis and detect a short, an open, a crossed pair, or a reversed pair in the cable 14. A short or an open may be detected without a load. The cable testers 10 can also determine a length of the cable 14 and a distance from one end of the cable 14 to a point where the cable 14 has a fault such as a short or an open condition.

For example, in a multi-conductor cable, a short condition occurs when two or more conductors in the cable 14 are short-circuited together. An open condition occurs when one or more conductors in the cable 14 lack continuity between both ends of the cable 14. A crossed pair occurs when a pair of conductors communicates with different pins at each end of the cable 14. For example, a first pair may communicate with pins 1 and 2 at one end and pins 3 and 6 at the other end. A reversed pair occurs when two ends in a pair are connected to opposite pins at each end of the cable 14. For example, a conductor connected to pin 1 on one end communicates with pin 2 at the other end, and a conductor connected to pin 2 on one end communicates with pin 1 at the other end.

The cable testers 10 employ time domain reflectometry (TDR), which is based on transmission line theory, to troubleshoot cable faults. The cable testers 10 transmit a pulse 17 on the cable 14 and analyze a reflection or a return pulse 18 when received. Specifically, the cable testers 10 measure a difference between a time when the pulse 17 is transmitted and a time when the return pulse 18 is received. Additionally, the cable testers 10 analyze characteristics such as shape and size of the return pulse 18 relative to the pulse 17 that is transmitted. By comparing the pulses 17 and 18 and based on electrical properties of the cable 14 such as a cable propagation constant, a cable distance can be estimated and a fault can be identified.

Conventional cable tests, however, may generate inaccurate results when the cable 14 is terminated by an active link partner generating link signals during a test. For example, TDR cannot determine cable length when the link is active, that is, when the link partner at the remote end of the cable 14 is active or in use. This is because the remote end of the cable 14 is properly terminated when the link partner is active. When the remote end of the cable 14 is properly terminated, the cable 14 functions as a substantially balanced transmission line. That is, when the remote end receives a TDR pulse, the remote end may return a very weak signal. Weak return signals cannot be analyzed unless extensive electronic circuits are used. Implementing extensive electronic circuits, however, can be expensive and may not be feasible in low-cost systems.

On the other hand, digital signal processing (DSP) can determine cable length when the link is active. In DSP, unlike in TDR, no pulses are injected into the cable 14. Instead, parameters such as amplitude, pulse width, pulse shape, etc., of signals that are normally transmitted and received on the cable 14 are measured to determine cable length. DSP, however, involves making some assumptions and therefore yields cable length measurements that are approximate rather than accurate.

For example, if cable length is determined based on amplitude of a received signal, the amplitude of the transmitted signal is generally unknown or unknowable and therefore needs to be assumed. Additionally, any attenuation in the received signal is calculated by assuming an average attenuation per unit length of the cable 14. Therefore, the length of the cable 14 determined using DSP is generally an approximate estimate rather than an accurate measurement.

Thus, in low-cost systems, since TDR cannot analyze reflections from a terminated or an active remote end, TDR cannot determine cable length even if the cable is good, i.e., even if the cable has no fault. On the other hand, although length of a cable properly terminated or connected to an active remote end can be determined using DSP, DSP fails to determine the length if the cable is too long for local and remote ends to communicate.

SUMMARY

A physical layer module (PHY) of a network device comprises a control module and a cable-test module. The control module selectively generates a cable-test enable signal to test a cable including four pairs of twisted wire. The cable-test module tests the cable based on the cable-test enable signal. The cable-test module transmits test signals on the four pairs at a first time and receives return signals. The cable-test module determines that the cable is not faulty when the return signals received on first and second pairs of the four pairs have an amplitude less than a first predetermined amplitude, and when the return signals received on third and fourth pairs of the four pairs have an amplitude greater than a second predetermined amplitude and are received substantially contemporaneously.

In another feature, the cable-test module calculates a length of the cable based on a time difference between the first time and a second time when the return signals are received on at least one of the third and fourth pairs. The PHY communicates the length to the network device.

In another feature, the second predetermined amplitude is greater than the first predetermined amplitude and wherein values of the first predetermined amplitude and the second predetermined amplitude are based on the length and electrical characteristics of the cable.

In another feature, the third and fourth pairs are selectively short-circuited in the PHY when the PHY communicates in Fast Ethernet mode.

In another feature, the cable connects the PHY to a remote PHY that communicates in Fast Ethernet mode, wherein the first and second pairs are terminated and the third and fourth pairs are short-circuited in the remote PHY.

In another feature, the cable-test module determines that the cable is faulty due to a short-circuit in at least one of the first and second pairs when the return signals on at least one of the first and second pairs are received before the return signals are received on at least one of the third and fourth pairs, and when the return signals received on at least one of the first and second pairs have an amplitude greater than the second predetermined amplitude.

In another feature, the cable-test module determines that the cable is faulty due to a short-circuit in at least one of the third and fourth pairs when the return signals on the third and fourth pairs are not received substantially contemporaneously.

In another feature, the cable-test module determines that the cable is faulty due to an open circuit in the cable when at least one of the return signals includes a non-inverted test signal.

In another feature, the cable-test module determines that the cable is one of faulty due to an open circuit in the cable and not faulty but disconnected at a remote end when the return signals include non-inverted test signals that are received substantially contemporaneously.

In another feature, the cable-test module determines a fault distance from the PHY to a point of a fault due to one of an open circuit and a short circuit in the cable by analyzing the return signals.

In another feature, the cable-test module calculates the fault distance based on a time difference between the first time and a second time when the return signals are received on at least one of the four pairs. The PHY communicates the fault distance to the network device.

In another feature, the control module opens short-circuits in the third and fourth pairs in the PHY when the PHY communicates in Fast Ethernet mode and during the test. The control module short-circuits the third and fourth pairs in the PHY when the PHY communicates in Fast Ethernet mode and when the cable-test module does not test the cable.

In another feature, a network device comprises the PHY.

In still other features, a method used by a physical layer module (PHY) of a network device comprises selectively generating a cable-test enable signal to test a cable that includes four pairs of twisted wire and testing the cable based on the cable-test enable signal. The testing includes transmitting test signals on the four pairs at a first time and receiving return signals. The testing further includes determining that the cable is not faulty when the return signals received on first and second pairs of the four pairs have an amplitude less than a first predetermined amplitude, and when the return signals received on third and fourth pairs of the four pairs have an amplitude greater than a second predetermined amplitude and are received substantially contemporaneously.

In another feature, the method further comprises calculating a length of the cable based on a time difference between the first time and a second time when the return signals are received on at least one of the third and fourth pairs. The method further comprises communicating the length to the network device.

In another feature, the second predetermined amplitude is greater than the first predetermined amplitude and wherein values of the first predetermined amplitude and the second predetermined amplitude are based on the length and electrical characteristics of the cable.

In another feature, the method further comprises selectively short-circuiting the third and fourth pairs in the PHY when the PHY communicates in Fast Ethernet mode.

In another feature, the cable connects the PHY with the cable to a remote PHY that communicates in Fast Ethernet mode, wherein the first and second pairs are terminated and the third and fourth pairs are short-circuited in the remote PHY.

In another feature, the method further comprises determining that the cable is faulty due to a short-circuit in at least one of the first and second pairs when the return signals on at least one of the first and second pairs are received before the return signals are received on at least one of the third and fourth pairs, and when the return signals received on at least one of the first and second pairs have an amplitude greater than the second predetermined amplitude.

In another feature, the method further comprises determining that the cable is faulty due to a short-circuit in at least one of the third and fourth pairs when the return signals on the third and fourth pairs are not received substantially contemporaneously.

In another feature, the method further comprises determining that the cable is faulty due to an open circuit in the cable when at least one of the return signals includes a non-inverted test signal.

In another feature, the method further comprises determining that the cable is one of faulty due to an open circuit in the cable and not faulty but disconnected at a remote end when the return signals include non-inverted test signals that are received substantially contemporaneously.

In another feature, the method further comprises determining a fault distance from the PHY to a point of a fault due to one of an open circuit and a short circuit in the cable by analyzing the return signals.

In another feature, the method further comprises calculating the fault distance based on a time difference between the first time and a second time when the return signals are received on at least one of the four pairs. The method further comprises communicating the fault distance to the network device.

In another feature, the method further comprises opening short-circuits in the third and fourth pairs in the PHY when the PHY communicates in Fast Ethernet mode and during the test. The method further comprises short-circuiting the third and fourth pairs in the PHY when the PHY communicates in Fast Ethernet mode and when the cable-test module does not test the cable.

In still other features, a physical layer module (PHY) of a network device comprises control means for selectively generating a cable-test enable signal to test a cable including four pairs of twisted wire. The PHY further comprises cable-test means for testing the cable based on the cable-test enable signal, wherein the cable-test means transmits test signals on the four pairs at a first time and receives return signals. The cable-test means determines that the cable is not faulty when the return signals received on first and second pairs of the four pairs have an amplitude less than a first predetermined amplitude, and when the return signals received on third and fourth pairs of the four pairs have an amplitude greater than a second predetermined amplitude and are received substantially contemporaneously.

In another feature, the cable-test means calculates a length of the cable based on a time difference between the first time and a second time when the return signals are received on at least one of the third and fourth pairs. The PHY communicates the length to the network device.

In another feature, the second predetermined amplitude is greater than the first predetermined amplitude and wherein values of the first predetermined amplitude and the second predetermined amplitude are based on the length and electrical characteristics of the cable.

In another feature, the third and fourth pairs are selectively short-circuited in the PHY when the PHY communicates in Fast Ethernet mode.

In another feature, the cable connects the PHY to a remote PHY that communicates in Fast Ethernet mode, wherein the first and second pairs are terminated and the third and fourth pairs are short-circuited in the remote PHY.

In another feature, the cable-test means determines that the cable is faulty due to a short-circuit in at least one of the first and second pairs when the return signals on at least one of the first and second pairs are received before the return signals are received on at least one of the third and fourth pairs, and when the return signals received on at least one of the first and second pairs have an amplitude greater than the second predetermined amplitude.

In another feature, the cable-test means determines that the cable is faulty due to a short-circuit in at least one of the third and fourth pairs when the return signals on the third and fourth pairs are not received substantially contemporaneously.

In another feature, the cable-test means determines that the cable is faulty due to an open circuit in the cable when at least one of the return signals includes a non-inverted test signal.

In another feature, the cable-test means determines that the cable is one of faulty due to an open circuit in the cable and not faulty but disconnected at a remote end when the return signals include non-inverted test signals that are received substantially contemporaneously.

In another feature, the cable-test means determines a fault distance from the PHY to a point of a fault due to one of an open circuit and a short circuit in the cable by analyzing the return signals.

In another feature, the cable-test means calculates the fault distance based on a time difference between the first time and a second time when the return signals are received on at least one of the four pairs. The PHY communicates the fault distance to the network device.

In another feature, the control means opens short-circuits in the third and fourth pairs in the PHY when the PHY communicates in Fast Ethernet mode and during the test. The control means short-circuits the third and fourth pairs in the PHY when the PHY communicates in Fast Ethernet mode and when the cable-test means does not test the cable.

In another feature, a network device comprises the PHY.

In still other features, a computer program executed by a processor in a physical layer module (PHY) of a network device comprises selectively generating a cable-test enable signal to test a cable that includes four pairs of twisted wire and testing the cable based on the cable-test enable signal. The testing includes transmitting test signals on the four pairs at a first time and receiving return signals. The testing further includes determining that the cable is not faulty when the return signals received on first and second pairs of the four pairs have an amplitude less than a first predetermined amplitude, and when the return signals received on third and fourth pairs of the four pairs have an amplitude greater than a second predetermined amplitude and are received substantially contemporaneously.

In another feature, the computer program further comprises calculating a length of the cable based on a time difference between the first time and a second time when the return signals are received on at least one of the third and fourth pairs. The computer program further comprises communicating the length to the network device.

In another feature, the second predetermined amplitude is greater than the first predetermined amplitude and wherein values of the first predetermined amplitude and the second predetermined amplitude are based on the length and electrical characteristics of the cable.

In another feature, the computer program further comprises selectively short-circuiting the third and fourth pairs in the PHY when the PHY communicates in Fast Ethernet mode.

In another feature, the cable connects the PHY with the cable to a remote PHY that communicates in Fast Ethernet mode, wherein the first and second pairs are terminated and the third and fourth pairs are short-circuited in the remote PHY.

In another feature, the computer program further comprises determining that the cable is faulty due to a short-circuit in at least one of the first and second pairs when the return signals on at least one of the first and second pairs are received before the return signals are received on at least one of the third and fourth pairs, and when the return signals received on at least one of the first and second pairs have an amplitude greater than the second predetermined amplitude.

In another feature, the computer program further comprises determining that the cable is faulty due to a short-circuit in at least one of the third and fourth pairs when the return signals on the third and fourth pairs are not received substantially contemporaneously.

In another feature, the computer program further comprises determining that the cable is faulty due to an open circuit in the cable when at least one of the return signals includes a non-inverted test signal.

In another feature, the computer program further comprises determining that the cable is one of faulty due to an open circuit in the cable and not faulty but disconnected at a remote end when the return signals include non-inverted test signals that are received substantially contemporaneously.

In another feature, the computer program further comprises determining a fault distance from the PHY to a point of a fault due to one of an open circuit and a short circuit in the cable by analyzing the return signals.

In another feature, the computer program further comprises calculating the fault distance based on a time difference between the first time and a second time when the return signals are received on at least one of the four pairs. The computer program further comprises communicating the fault distance to the network device.

In another feature, the computer program further comprises opening short-circuits in the third and fourth pairs in the PHY when the PHY communicates in Fast Ethernet mode and during the test. The computer program further comprises short-circuiting the third and fourth pairs in the PHY when the PHY communicates in Fast Ethernet mode and when the cable-test module does not test the cable.

In still other features, the systems and methods described above are implemented by a computer program executed by one or more processors. The computer program can reside on a computer readable medium such as but not limited to memory, non-volatile data storage and/or other suitable tangible storage mediums.

Further areas of applicability of the present disclosure will become apparent from the detailed description provided hereinafter. It should be understood that the detailed description and specific examples, while indicating the preferred embodiment of the invention, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
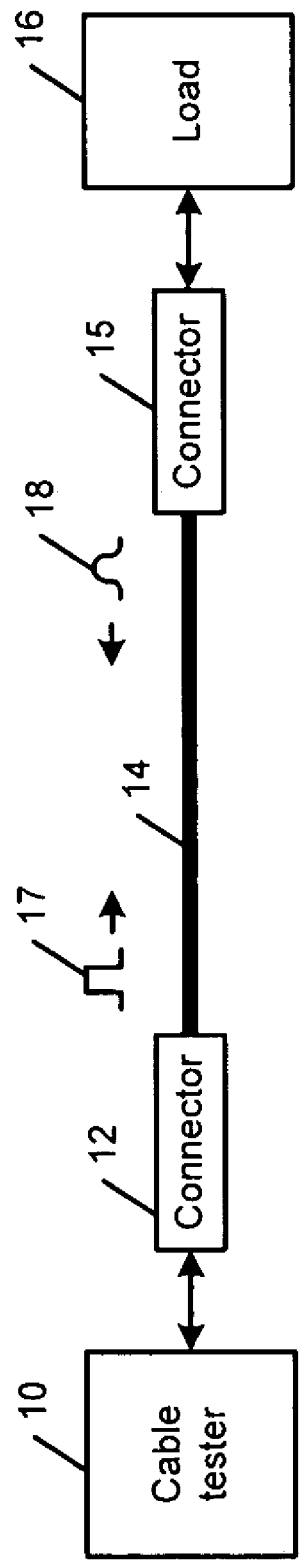
FIG. 1 is a functional block diagram of a cable tester according to the prior art.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

A network device generally comprises a physical layer module (PHY) and a medium access controller (MAC). In wired networks, the PHY connects the network device to a cable. The MAC provides an interface between the PHY and a host.

Figure 2:
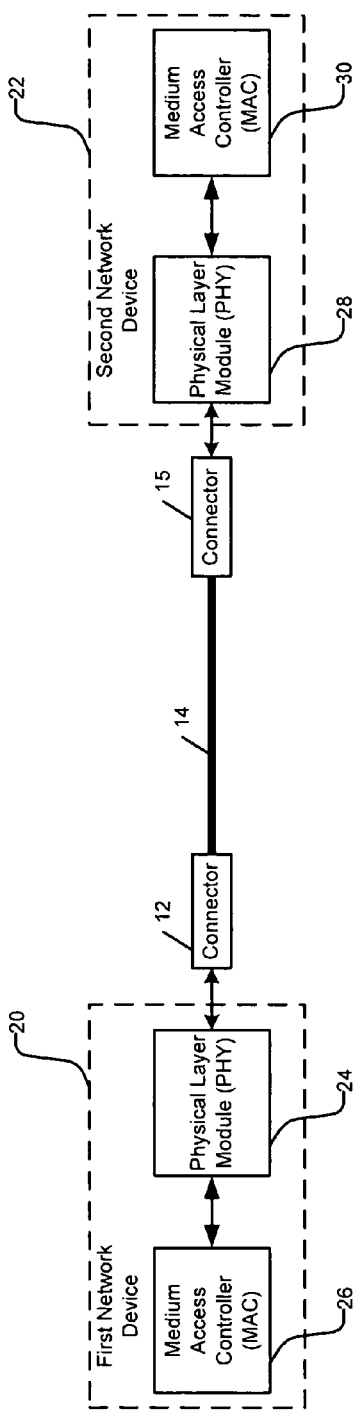
FIG. 2 is a functional block diagram of an exemplary network comprising a first network device communicating with a second network device via a twisted-pair cable.
Figure 3:
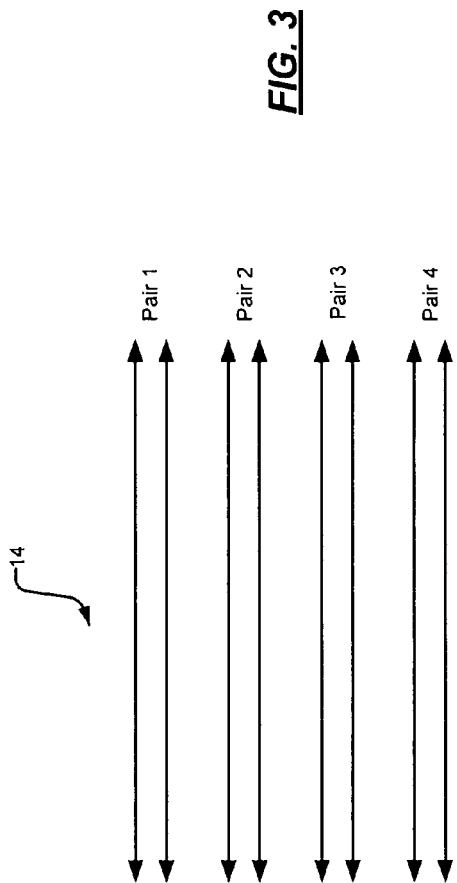
FIG. 3 shows components of the twisted-pair cable of FIG. 2.

Referring now to FIGS. 2-3, a first network device 20 is connected to a second network device 22 using a cable 14. The first network device 20 comprises a PHY 24 and a MAC 26. The PHY 24 is coupled to the cable 14 via a connector 12. The second network device 22 comprises a PHY 28 and a MAC 30. The PHY 28 is coupled to the cable 14 via a connector 15.

In an Ethernet-based network, the cable 14 is generally a CAT 5 or CAT 6 twisted-pair cable having eight conductors. The eight conductors may be grouped into four pairs of twisted wire as shown in FIG. 3 (twist not shown). The connectors 12 and 15 are generally RJ45 connectors. Although the present disclosure refers to CAT5 and CAT6 cables, the systems and methods disclosed herein are also applicable to CAT3 cable. Additionally, the systems and methods disclosed herein may be applicable to cables having more than four pairs of conductors.

PHYs may be equipped with a built-in cable tester. The built-in cable tester reduces need for an external cable tester. Additionally, the built-in cable tester may be activated and deactivated remotely when a cable problem is to be diagnosed. The built-in cable tester can test a cable connected to the PHY on one end and to a remote PHY on another end. Additionally, the built-in cable tester can measure length of the cable (i.e., cable length) using time domain reflectometry (TDR) even when the cable is terminated in the remote PHY. The built-in cable tester can measure the cable length using TDR without employing expensive signal processing circuits. Thus, the built-in cable tester measure the cable length cost-effectively.

Specifically, the built-in cable tester tests the cable and measures the cable length by performing TDR pair-by-pair on all pairs of the cable. In doing so, the built-in cable tester can distinguish an actual short-circuit in a pair that is in use, which can be a fault condition, from a short-circuit in unused pairs, which is not a fault condition. In fact, the built-in cable tester utilizes short-circuits in the unused pairs to measure the cable length since the unused pairs indicate short-circuits at substantially same distance.

The built-in cable tester transmits multiple pulses over each pair of the cable. For each transmitted pulse, the built-in cable tester receives a reflection or a return pulse from the remote end of the cable or from a point of fault along the length of the cable. The reflections may be averaged. The built-in cable tester analyzes the return pulses and determines cable status such as an open, a short, no fault, cable length, etc. Additionally, the built-in cable tester determines a distance from the PHY to the remote end of the cable, which is the length of the cable, or the distance from the PHY to a point of fault along the length of the cable.

Ethernet network devices may operate in Fast Ethernet (FE) mode or Gigabit Ethernet (GE) mode. Data is communicated at 100 Megabits per second (Mbps) in the FE mode and at 1000 Mbps (i.e., 1 Gigabit per second) in the GE mode. The mode of operation depends on characteristics of the link and/or link partners. In the FE mode, data is communicated using two of the four pairs in the cable. The two unused pairs in the cable are generally shorted in the PHYs. On the other hand, in the GE mode, data is communicated using all four pairs in the cable.

Figure 4:
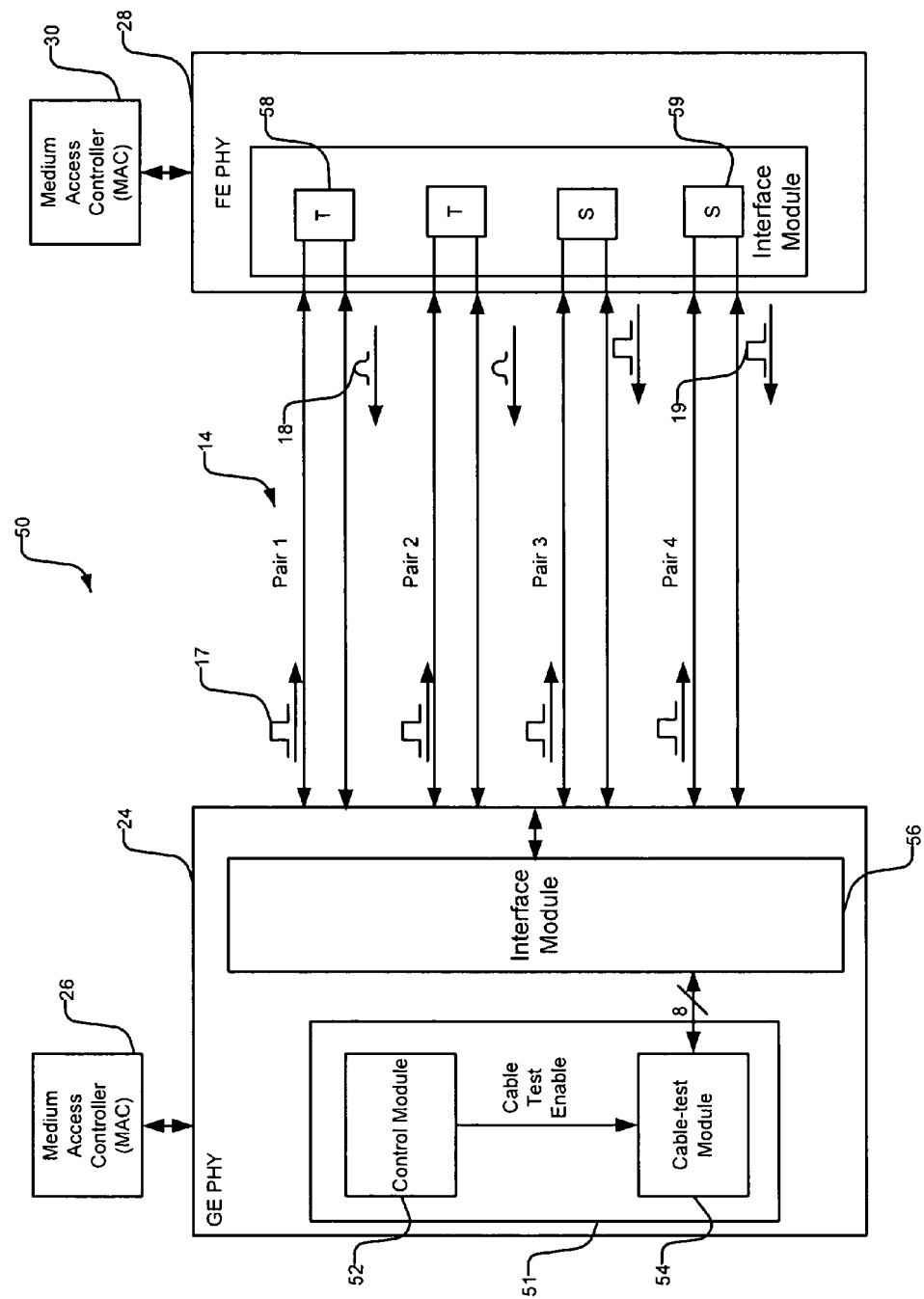
FIG. 4 is a functional block diagram of an exemplary cable tester built into a physical layer module (PHY) of a network device operating in Gigabit Ethernet mode according to the present disclosure.

Referring now to FIG. 4, a system 50 for testing a cable 14 using a built-in cable tester 51 is shown. The cable tester 51 uses TDR to determine cable status (e.g., a fault due to an open or a short-circuit) and to measure a length of the cable 14 (i.e., cable length). The built-in cable tester 51 measures the cable length using TDR even when the cable 14 is connected to another PHY at the remote end. The cable tester 51 uses TDR pair-by-pair to measure the cable length with substantial accuracy while the cable 14 is connected to network devices that are active (e.g., link partners). Additionally, the cable tester 51 measures a distance at which the cable 14 may be faulty with substantial accuracy.

The cable 14 comprising four pairs of wires connects a PHY 24 of a first network device 20 (not shown) to a PHY 28 of a second network device 22 (not shown). Connectors 12 and 15 are not shown for simplicity. In the exemplary implementation shown, the first network device 20 operates in GE mode, and the second network device 22 operates in FE mode. Accordingly, the PHY 24 may be referred to as GE PHY 24, and the PHY 28 may be referred to as FE PHY 28. Pairs 3 and 4 are normally shorted in the FE PHY 28.

The GE PHY 24 comprises the built-in cable tester 51 and an interface module 56. The cable tester 51 comprises a control module 52 and a cable-test module 54. The control module 52 determines when to perform a cable test. For example, the cable tester 51 may perform a cable test randomly or based on events such as power on self-test, user-initiated diagnostics, etc. That is, the GE PHY 24 may test the cable 14 when the first network device 20 is powered on or when a user of the first network device 20 initiates the cable test to troubleshoot a problem.

When performing the cable test, the control module 52 generates a cable-test enable signal. The cable-test enable signal activates the cable-test module 54. The cable-test module 54 generates pulses 17. The cable-test module 54 transmits pulses 17 over each pair of wires of the cable 14. The cable-test module 54 determines a status of the cable 14 by analyzing return pulses 18 received on pairs 1 and 2 and return pulses 19 received on pairs 3 and 4 from the FE PHY 28. Hereinafter, return pulses 18 are referred to as pulses 18, and return pulses 19 are referred to as pulses 19.

Since pairs 1 and 2 are properly terminated in the FE PHY 28 by terminators 58, pulses 18 may have amplitudes less than a first predetermined amplitude. The first predetermined amplitude may be insubstantial or substantially smaller than the amplitude of pulses 17. The value of the first predetermined amplitude may vary depending on a variety of factors such as termination, cable length, interference from external sources, etc. Consequently, the cable-test module 54 may be unable to analyze pulses 18.

On the other hand, since pairs 3 and 4 are normally shorted in the FE PHY 28 by short-circuits 59, pulses 19 received by the cable-test module 54 may be substantially similar to pulses 17 transmitted on pairs 3 and 4. For example, pulses 19 may have amplitudes greater than a second predetermined amplitude. The second predetermined amplitude may be substantially similar to the amplitude of the pulse 17 and may vary depending on a variety of factors such as termination, cable length, interference from external sources, etc. Additionally, characteristics such as amplitude, pulse width, pulse shape, etc., of the pulse 19 received on pair 3 may be substantially similar to characteristics of the pulse 19 received on pair 4 because pair 3 and pair 4 are shorted in FE PHY 28 at approximately the same distance from GE PHY 24.

Thus, the cable-test module 54 determines that the cable 14 is in good condition if (1) characteristics of the pulse 19 received on pair 3 are substantially similar to characteristics of the pulse 19 received on pair 4, (2) characteristics of the pulses 19 received on pairs 3 and 4 are substantially similar to characteristics of the pulse 17, and (3) pulses 18 received on pairs 1 and 2 are of insubstantial amplitude.

When the cable 14 is in good condition, the cable-test module 54 determines a length of the cable 14 between the GE PHY 24 and the FE PHY 28. The cable-test module 54 determines the length based on (1) a time difference between transmitted pulses 17 and received pulses 19 on pairs 3 and 4, and (2) electrical characteristics such as specific resistance, propagation constant, etc., of the cable 14.

Additionally, the cable-test module 54 determines whether the cable 14 is faulty due to an open and/or a short-circuit in one or more of the four pairs. For example, the cable 14 may be open if pulses 19 received on one or more of the four pairs are non-inverted reflections of the pulse 17. If, however, pulses 19 received on all four pairs are non-inverted and are received at substantially the same time, the cable 14 may be faulty due to an open circuit or may be in good condition but disconnected at the remote end.

On the other hand, the cable 14 may be faulty due to a short-circuit in pair 1 and/or pair 2 if pulses 18 received on pair 1 and/or pair 2 (1) are substantially similar to the pulse 17, (2) are inverted reflections of the pulse 17, and (3) are received before the pulses 19 are received on pairs 3 and 4.

Similarly, the cable 14 may be faulty due to a short-circuit in pair 3 (or pair 4) if the pulse 19 (1) is received on pair 3 (or pair 4) before the pulse 19 is received on pair 4 (or pair 3) and (2) is an inverted reflection of the pulse 17. The cable-test module 54 determines a distance between the GE PHY 24 and a point of open and/or short-circuit in the cable 14 in the same manner as the cable-test module 54 determines the length of the cable 14.

The GE PHY 24 communicates the length of the cable 14 and the distance between the GE PHY 24 and the point of open and/or short-circuit in the cable 14 to the MAC 26. The MAC 26 communicates the information to the first network device 20. The first network device 20, in turn, communicates the information to the user of the first network device 20.

Since PHYs of some network devices that operate in FE mode have pairs 3 and 4 normally shorted, the FE PHYs generally may not be able to initiate cable tests using a built-in cable tester. The FE PHYs, however, can initiate cable tests if the short-circuits in pairs 3 and 4 in the FE PHYs are selectively opened when the FE PHYs initiate cable tests. Thereafter, the short-circuits may be closed for normal operation.

Figure 5:
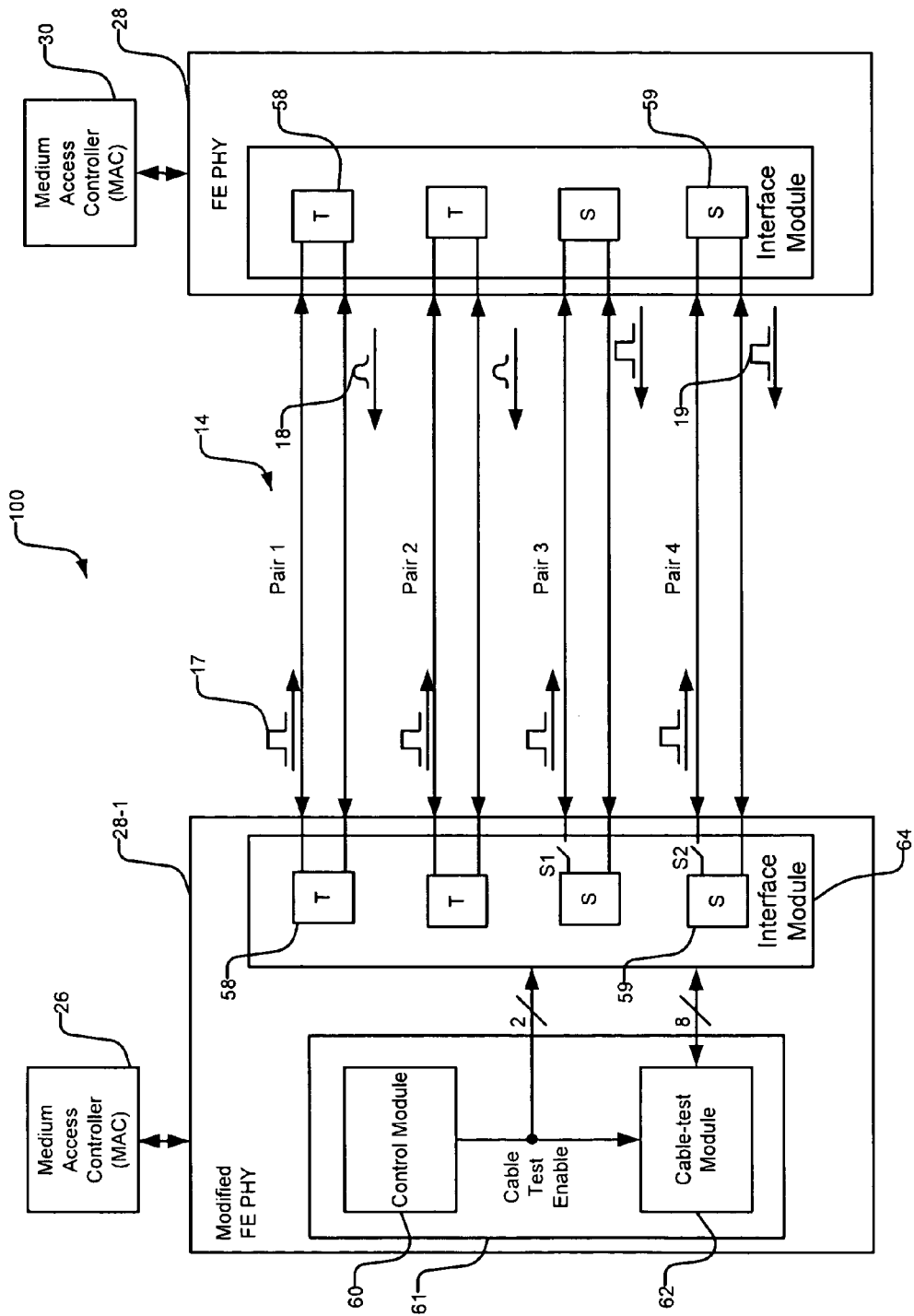
FIG. 5 is a functional block diagram of an exemplary cable tester built into a physical layer module (PHY) of a network device operating in Fast Ethernet mode according to the present disclosure.

Referring now to FIG. 5, a system 100 for testing a cable 14 using a built-in cable tester 61 is shown. The cable tester 61 uses TDR to determine cable status such as whether the cable 14 is open, shorted, terminated, or connected to another PHY at the remote end. Additionally, the cable tester 61 uses TDR to measure cable length with substantial accuracy while the cable 14 is connected to network devices that are active. The cable tester 61 measures a distance at which the cable 14 may be faulty with substantial accuracy.

The cable 14 comprising four pairs of wires connects a PHY 28-1 of a network device 20 (not shown) to the PHY 28 of the second network device 22 (not shown). Connectors are not shown for simplicity. The first network device 20 and the second network device 22 operate in FE mode. Thus, the PHY 28-1 may be referred to as FE PHY 28-1, and the PHY 28 may be referred to as FE PHY 28.

The FE PHY 28-1 is essentially a modified FE PHY 28. The FE PHY 28-1 comprises the built-in cable tester 61 and an interface module 64. The built-in cable tester 61 comprises a control module 60 and a cable-test module 62. The interface module 64 comprises switches S1 and S2. The switches S1 and S2 are shown as mechanical switches for illustrative purposes. The switches S1 and S2 may be logical switches that can be opened and closed electronically. The switches S1 and S2 are normally closed so that the wires in pair 3 and pair 4 of the cable 14 are shorted for normal operation in FE mode.

The control module 60 determines when to perform a cable test. For example, the cable tester 61 may perform a cable test randomly or based on events such as power on self-test, user-initiated diagnostics, etc. When the control module 60 initiates a cable test, the switches S1 and S2 are opened by a cable-test enable signal generated by the control module 60. The cable-test enable signal also activates the cable-test module 62. The cable-test module 62 transmits one pulse 17 along each of the four pairs of wire of the cable 14. The cable-test module 62 determines the status of the cable 14 by analyzing return pulses 18 received on pairs 1 and 2 and return pulses 19 received on pairs 3 and 4 from the FE PHY 28. Hereinafter, return pulses 18 are referred to as pulses 18, and return pulses 19 are referred to as pulses 19.

Since pairs 1 and 2 are properly terminated in the FE PHY 28 by terminators 58, pulses 18 may have amplitudes less than a first predetermined amplitude. The first predetermined amplitude may be insubstantial or substantially smaller than the amplitude of pulses 17. The value of the first predetermined amplitude may vary depending on a variety of factors such as termination, cable length, interference from external sources, etc. Consequently, the cable-test module 54 may be unable to analyze pulses 18.

On the other hand, since pairs 3 and 4 are normally shorted in the FE PHY 28 by short-circuits 59, pulses 19 received by the cable-test module 54 may be substantially similar to pulses 17 transmitted on pairs 3 and 4. For example, pulses 19 may have amplitudes greater than a second predetermined amplitude. The second predetermined amplitude may be substantially similar to the amplitude of the pulse 17 and may vary depending on a variety of factors such as termination, cable length, interference from external sources, etc. Additionally, characteristics such as amplitude, pulse width, pulse shape, etc., of the pulse 19 received on the pair 3 may be substantially similar to characteristics of the pulse 19 received on the pair 4 because pair 3 and pair 4 are shorted in the FE PHY 28 at approximately the same distance from the FE PHY 28-1.

Thus, the cable-test module 62 determines that the cable 14 is in good condition if (1) characteristics of the pulse 19 received on pair 3 are substantially similar to characteristics of the pulse 19 received on pair 4, (2) characteristics of the pulses 19 received on pairs 3 and 4 are substantially similar to characteristics of the pulse 17, and (3) pulses 18 received on pairs 1 and 2 are of insubstantial amplitude.

When the cable 14 is in good condition, the cable-test module 62 determines a length of the cable 14 between the FE PHY 28-1 and the FE PHY 28. The cable-test module 62 determines the length based on (1) a time difference between transmitted pulses 17 and received pulses 19 on pairs 3 and 4, and (2) electrical characteristics such as specific resistance, propagation constant, etc., of the cable 14.

Additionally, the cable-test module 62 determines whether the cable 14 is faulty due to an open and/or a short-circuit in one or more of the four pairs. For example, the cable 14 may be open if pulses 19 received on one or more pairs are non-inverted reflections of the pulse 17. If, however, pulses 19 received on all four pairs are non-inverted and are received at substantially the same time, the cable 14 may be faulty due to an open circuit or may be in good condition but disconnected at the remote end.

On the other hand, the cable 14 may be faulty due to a short-circuit in pair 1 and/or pair 2 if pulses 18 received on pair 1 and/or 2 (1) are substantially similar to the pulse 17, (2) are inverted reflections of the pulse 17, and (3) are received before the pulses 19 are received on pairs 3 and 4. Similarly, the cable 14 may be faulty due to a short-circuit in pair 3 (or pair 4) if the pulse 19 (1) is received on pair 3 (or pair 4) before the pulse 19 is received on pair 4 (or pair 3) and (2) is an inverted reflection of the pulse 17.

The cable-test module 62 determines a distance between the FE PHY 28-1 and a point of open and/or short-circuit in the cable 14 in the same manner as the cable-test module 62 determines the length of the cable 14. Thereafter, the control module 60 toggles the cable-test enable signal to close the short-circuits 59 for normal operation.

The FE PHY 28-1 communicates the length of the cable 14 and the distance between the FE PHY 28-1 and the point of open and/or short-circuit in the cable 14 to the MAC 26. The MAC 26 communicates the information to the first network device 20. The first network device 20, in turn, communicates the information to the user of the first network device 20.

Figure 6:
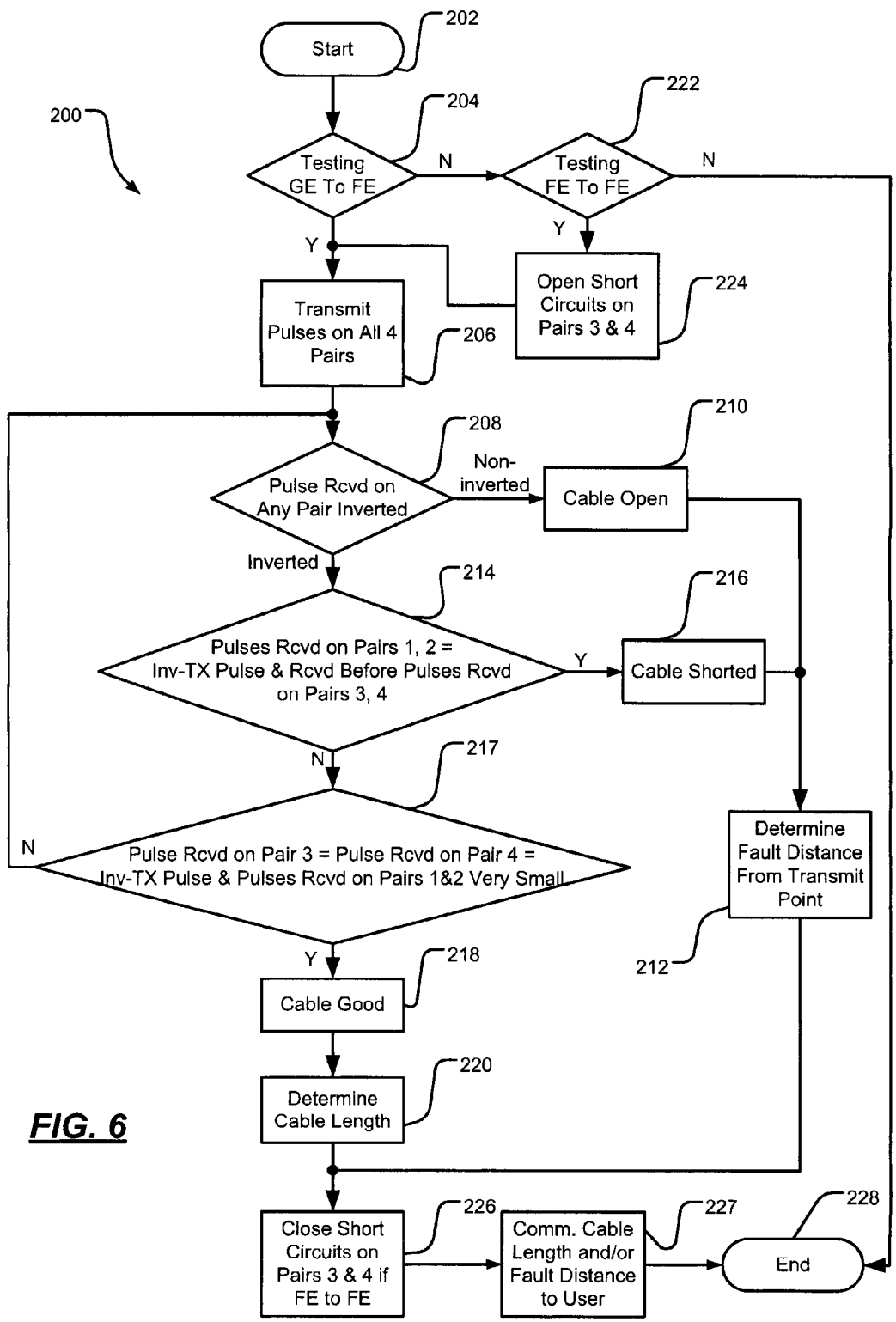
FIG. 6 is a flowchart of a method for testing cables using a cable tester built into a PHY of a network device according to the present disclosure.

Referring now to FIG. 6, a method 200 for testing a cable using a cable tester that is built into in a PHY of a network device begins at step 202. The cable tester uses TDR to determine cable status such as whether the cable 14 is open, shorted, terminated, or connected to another PHY at the remote end. Additionally, the cable tester uses TDR to measure cable length with substantial accuracy while the cable 14 is connected to network devices that are active. The cable tester measures a distance at which the cable 14 may be faulty with substantial accuracy.

Initially, a determination is made in step 204 if a PHY 24 comprising a built-in cable tester 51 operates in GE mode and if the PHY 24 communicates via a cable 14 with a PHY 28 that operates in FE mode. If true, a control module 52 in the cable tester 51 activates a cable-test module 54 in the cable tester 51, and the cable-test module 54 transmits pulses 17 over the cable 14 in step 206.

The cable-test module 54 determines in step 208 if a return pulse received on any pair is non-inverted. If true, the control module 52 determines in step 210 that the cable 14 is open. The cable-test module 54 analyzes the received return pulses and determines in step 212 a distance between the PHY 24 and a point where the cable 14 may be open. If false, the cable-test module 54 determines in step 214 if pulses 18 received on pair 1 and/or pair 2 are substantially similar to inverted pulse 17 and are received before the return pulses 19 are received on pairs 3 and 4. If true, the control module 52 determines in step 216 that the cable 14 is shorted. The cable-test module 54 analyzes the received return pulses and determines in step 212 a distance between the PHY 24 and the point where the cable 14 may be shorted.

If the result in step 214 is false, the control module 52 determines in step 217 whether (1) the pulse 19 received on pair 3 is substantially similar to the pulse 19 received on pair 4 and substantially similar to inverted pulse 17 and (2) the pulses 18 received on pairs 1 and 2 have amplitudes insubstantial relative to the pulse 17. If true, the control module 52 determines in step 218 that the cable 14 is good. The control module 52 determines in step 220 a length of the cable 14 between the PHY 24 and the PHY 28. If false, steps 208 through 217 are repeated.

If the result in step 204 is false, a determination is made in step 222 if a PHY 28-1 comprising a built-in cable tester 61 operates in FE mode and if the PHY 28-1 communicates via a cable 14 with a PHY 28 that operates in FE mode. If false, the method 200 ends in step 228. If true, a control module 60 in the cable tester 61 that is built into the PHY 28-1 generates a cable-test enable signal that opens short-circuits 59 in pairs 3 and 4 in the PHY 28-1 in step 224. Steps 206 through 220 are repeated by the control module 60 and the cable-test module 62. The control module 60 closes short-circuits 59 in pairs 3 and 4 in step 226 for normal operation. The length of the cable 14 determined in step 220 and/or the distance to the open/short-circuit in the cable 14 determined in step 212 is communicated to the user in step 227. The method 200 ends in step 228.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A physical layer module (PHY), comprising:
    a control module that selectively generates a cable-test enable signal to test a cable including four pairs of twisted wire; and
    a cable-test module that tests the cable based on the cable-test enable signal,
    wherein the cable-test module (i) transmits test signals on the four pairs at a first time, (ii) receives return signals, and (iii) determines that the cable is not faulty when:
        the return signals received on a first pair and a second pair of the four pairs have an amplitude less than a first predetermined amplitude; and
        the return signals received on a third pair and a fourth pair of the four pairs have an amplitude greater than a second predetermined amplitude and are received substantially contemporaneously, and
    wherein the cable-test module determines that the cable is faulty due to a short-circuit in at least one of the first pair and the second pair when:
        the return signals on at least one of the first pair and the second pair are received before the return signals are received on at least one of the third and the fourth pair; and
        the return signals received on at least one of the first pair and the second pair have an amplitude greater than the second predetermined amplitude.

2. The PHY of claim 1, wherein the cable-test module calculates a length of the cable based on a time difference between the first time and a second time when the return signals are received on at least one of the third pair and the fourth pair.

3. The PHY of claim 2, wherein the PHY communicates the length to a network device.

4. The PHY of claim 1, wherein the second predetermined amplitude is greater than the first predetermined amplitude, and wherein values of the first predetermined amplitude and the second predetermined amplitude are based on (i) a length of the cable and (ii) electrical characteristics of the cable.

5. The PHY of claim 1, wherein the third pair and the fourth pair are selectively short-circuited in the PHY when the PHY communicates in a Fast Ethernet mode.

6. The PHY of claim 5, wherein the control module opens short-circuits in the third pair and the fourth pair in the PHY when the PHY communicates in the Fast Ethernet mode and when the cable-test module tests the cable.

7. The PHY of claim 5, wherein the control module short-circuits the third pair and the fourth pair in the PHY when the PHY communicates in the Fast Ethernet mode and when the cable-test module does not test the cable.

8. The PHY of claim 1, wherein the cable connects the PHY to a remote PHY that communicates in a Fast Ethernet mode, wherein the first pair and the second pair are terminated in the remote PHY, and wherein the third pair and the fourth pair are short-circuited in the remote PHY.

9. The PHY of claim 1, wherein the cable-test module determines that the cable is faulty due to a short-circuit in at least one of the third pair and the fourth pair when the return signals on the third pair and the fourth pair are not received substantially contemporaneously.

10. The PHY of claim 1, wherein the cable test module determines that the cable is faulty due to an open circuit in the cable when at least one of the return signals includes a non-inverted test signal.

11. The PHY of claim 1, wherein the cable-test module determines (i) that the cable is faulty due to an open circuit in the cable or (ii) that the cable is not faulty but disconnected at a remote end when the return signals include non-inverted test signals that are received substantially contemporaneously.

12. The PHY of claim 1, wherein the cable-test module determines a fault distance from the PHY to a point of a fault due to (i) an open circuit in the cable or (ii) a short circuit in the cable by analyzing the return signals.

13. The PHY of claim 12, wherein the cable test module calculates the fault distance based on a time difference between the first time and a second time when the return signals are received on at least one of the four pairs.

14. The PHY of claim 12, wherein the PHY communicates the fault distance to a network device.

15. A network device comprising the PHY of claim 1.

16. A method used by a physical layer module (PHY) of a network device, the method comprising:
    selectively generating a cable-test enable signal to test a cable that includes four pairs of twisted wire;
    testing the cable based on the cable-test enable signal, wherein the testing includes:
        transmitting test signals on the four pairs at a first time;
        receiving return signals; and
        determining that the cable is not faulty when:
            the return signals received on a first pair and a second pair of the four pairs have an amplitude less than a first predetermined amplitude; and
            the return signals received on a third pair and a fourth pair of the four pairs have an amplitude greater than a second predetermined amplitude and are received substantially contemporaneously, and
        determining that the cable is faulty due to a short-circuit in at least one of the first pair and the second pair when:
            the return signals on at least one of the first pair and the second pair are received before the return signals are received on at least one of the third pair and the fourth pair; and
            the return signals received on at least one of the first pair and the second pair have an amplitude greater than the second predetermined amplitude.

17. The method of claim 16, further comprising calculating a length of the cable based on a time difference between the first time and a second time when the return signals are received on at least one of the third pair and the fourth pair.

18. The method of claim 17, further comprising communicating the length to the network device.

19. The method of claim 16, wherein the second predetermined amplitude is greater than the first predetermined amplitude, and wherein values of the first predetermined amplitude and the second predetermined amplitude are based on (i) the length of the cable and (ii) electrical characteristics of the cable.

20. The method of claim 16, further comprising selectively short-circuiting the third pair and the fourth pair in the PHY when the PHY communicates in Fast Ethernet mode.

21. The method of claim 20, further comprising opening short-circuits in the third pair and the fourth pair in the PHY when the PHY communicates in Fast Ethernet mode and during the test.

22. The method of claim 20, further comprising short-circuiting the third pair and the fourth pair in the PHY when the PHY communicates in Fast Ethernet mode and when the cable is not tested.

23. The method of claim 16, wherein the cable connects the PHY to a remote PHY that communicates in Fast Ethernet mode, wherein the first pair and the second pair are terminated in the remote PHY, and wherein the third pair and the fourth pair are short-circuited in the remote PHY.

24. The method of claim 16, further comprising determining that the cable is faulty due to a short-circuit in at least one of the third pair and the fourth pair when the return signals on the third pair and the fourth pair are not received substantially contemporaneously.

25. The method of claim 16, further comprising determining that the cable is faulty due to an open circuit in the cable when at least one of the return signals includes a non-inverted test signal.

26. The method of claim 16, further comprising determining (i) that the cable is faulty due to an open circuit in the cable or (ii) that the cable is not faulty but disconnected at a remote end when the return signals include non-inverted test signals that are received substantially contemporaneously.

27. The method of claim 16, further comprising determining a fault distance from the PHY to a point of a fault due to (i) an open circuit in the cable or (ii) a short circuit in the cable by analyzing the return signals.

28. The method of claim 27, further comprising calculating the fault distance based on a time difference between the first time and a second time when the return signals are received on at least one of the four pairs.

29. The method of claim 27, further comprising communicating the fault distance to the network device.

30. A physical layer module (PHY), comprising:
control means for selectively generating a cable-test enable signal to test a cable including four pairs of twisted wire; and
cable-test means for testing the cable based on the cable test enable signal, wherein the cable-test means (i) transmits test signals on the four pairs at a first time, (ii) receives return signals, and (iii) determines that the cable is not faulty when:
the return signals received on a first pair and a second pair of the four pairs have an amplitude less than a first predetermined amplitude; and
the return signals received on a third pair and a fourth pair of the four pairs have an amplitude greater than a second predetermined amplitude and are received substantially contemporaneously, and
wherein the cable-test means determines that the cable is faulty due to a short-circuit in at least one of the first pair and the second pair when:
the return signals on at least one of the first pair and the second pair are received before the return signals are received on at least one of the third pair and the fourth pair; and
the return signals received on at least one of the first pair and the second pair have an amplitude greater than the second predetermined amplitude.

31. The PHY of claim 30, wherein the cable test means calculates a length of the cable based on a time difference between the first time and a second time when the return signals are received on at least one of the third pair and the fourth pair.

32. The PHY of claim 31, wherein the PHY communicates the length to a network device.

33. The PHY of claim 30, wherein the second predetermined amplitude is greater than the first predetermined amplitude, and wherein values of the first predetermined amplitude and the second predetermined amplitude are based on (i) the length of the cable and (ii) electrical characteristics of the cable.

34. The PHY of claim 30, wherein the third pair and the fourth pair are selectively short-circuited in the PHY when the PHY communicates in Fast Ethernet mode.

35. The PHY of claim 34, wherein the control means opens short-circuits in the third pair and the fourth pair in the PHY when the PHY communicates in Fast Ethernet mode and during the test.

36. The PHY of claim 34, wherein the control means short-circuits the third pair and the fourth pair in the PHY when the PHY communicates in Fast Ethernet mode and when the cable-test means does not test the cable.

37. The PHY of claim 30, wherein the cable connects the PHY to a remote PHY that communicates in Fast Ethernet mode, wherein the first pair and the second pair are terminated in the remote PHY, and wherein the third pair and the fourth pair are short-circuited in the remote PHY.

38. The PHY of claim 30, wherein the cable test means determines that the cable is faulty due to a short-circuit in at least one of the third pair and the fourth pair when the return signals on the third pair and the fourth pair are not received substantially contemporaneously.

39. The PHY of claim 30, wherein the cable-test means determines that the cable is faulty due to an open circuit in the cable when at least one of the return signals includes a non-inverted test signal.

40. The PHY of claim 30, wherein the cable test means determines (i) that the cable is faulty due to an open circuit in the cable or (ii) that the cable is not faulty but disconnected at a remote end when the return signals include non-inverted test signals that are received substantially contemporaneously.

41. The PHY of claim 30, wherein the cable-test means determines a fault distance from the PHY to a point of a fault due to (i) an open circuit in the cable or (ii) a short circuit in the cable by analyzing the return signals.

42. The PHY of claim 41, wherein the cable test means calculates the fault distance based on a time difference between the first time and a second time when the return signals are received on at least one of the four pairs.

43. The PHY of claim 41, wherein the PHY communicates the fault distance to a network device.

44. A network device comprising the PHY of claim 30.

* * * * *